No. 801,085. PATENTED OCT. 3, 1905.
C. L. IUNGERICH & C. S. GROVE.
INSECT DESTROYER.
APPLICATION FILED NOV. 30, 1904.

2 SHEETS—SHEET 1.

Calvin L. Iungerich and
Cornelius S. Grove, Inventors

Witnesses
by C. A. Snow & Co.
Attorneys

No. 801,085. PATENTED OCT. 3, 1905.
C. L. IUNGERICH & C. S. GROVE.
INSECT DESTROYER.
APPLICATION FILED NOV. 30, 1904.

2 SHEETS—SHEET 2.

Witnesses
E. F. Stewart
C. N. Woodward

Calvin L. Iungerich and
Cornelius S. Grove, Inventors
by C. A. Snow & Co.
Attorneys

UNITED STATES PATENT OFFICE.

CALVIN L. IUNGERICH AND CORNELIUS S. GROVE, OF HARRISBURG, PENNSYLVANIA.

INSECT-DESTROYER.

No. 801,085.       Specification of Letters Patent.       Patented Oct. 3, 1905.

Application filed November 30, 1904. Serial No. 234,917.

*To all whom it may concern:*

Be it known that we, CALVIN L. IUNGERICH and CORNELIUS S. GROVE, citizens of the United States, residing at Harrisburg, in the county of Dauphin and State of Pennsylvania, have invented a new and useful Insect-Destroyer, of which the following is a specification.

This invention relates to apparatus for removing insects from living plants and destroying the insects without injuring the plants, and has for its object to simplify and improve the construction and increase the efficiency of devices of this character.

With these and other objects in view, which will appear as the nature of the invention is better understood, the same consists in certain novel features of construction, as hereinafter fully described and claimed.

In the accompanying drawings, forming a part of this specification, and in which corresponding parts are denoted by like designating characters, is illustrated the preferred form of the embodiment of the invention capable of carrying the same into practical operation, it being understood that the invention is not necessarily limited thereto, as various changes in the shape, proportions, and general assemblage of the parts may be resorted to without departing from the principle of the invention or sacrificing any of its advantages.

Figure 1:
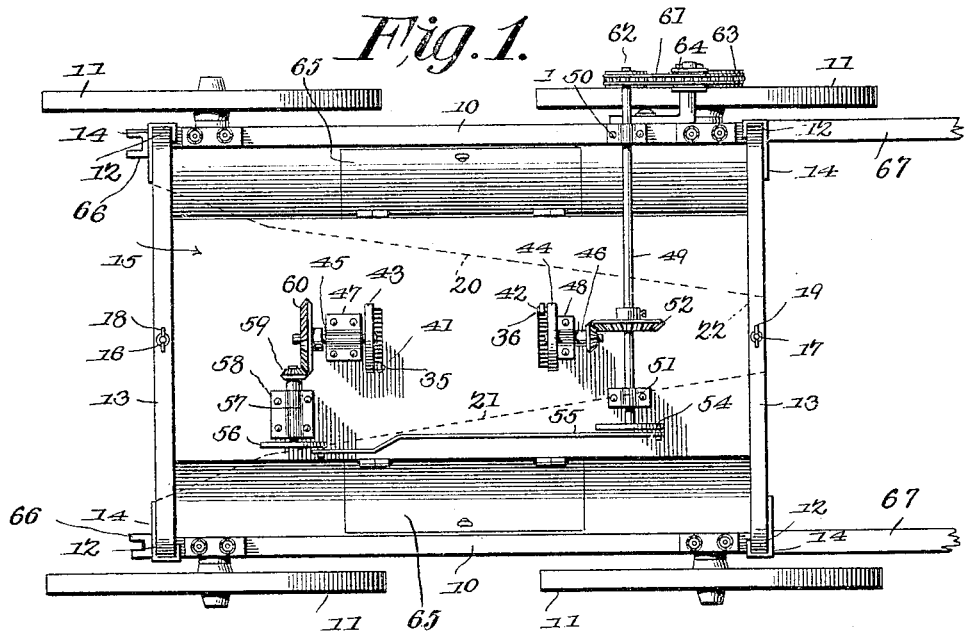
Figure 2:
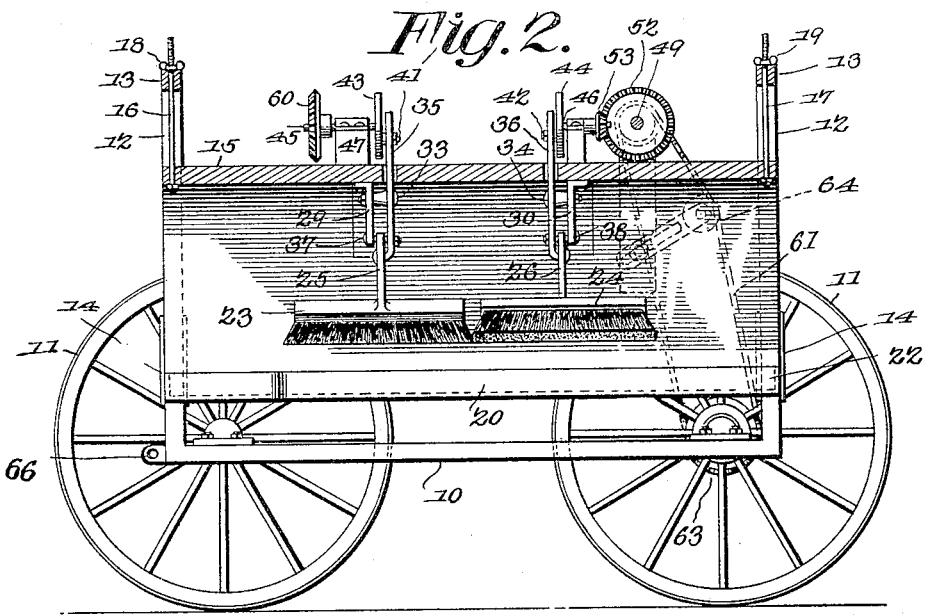
Figure 3:
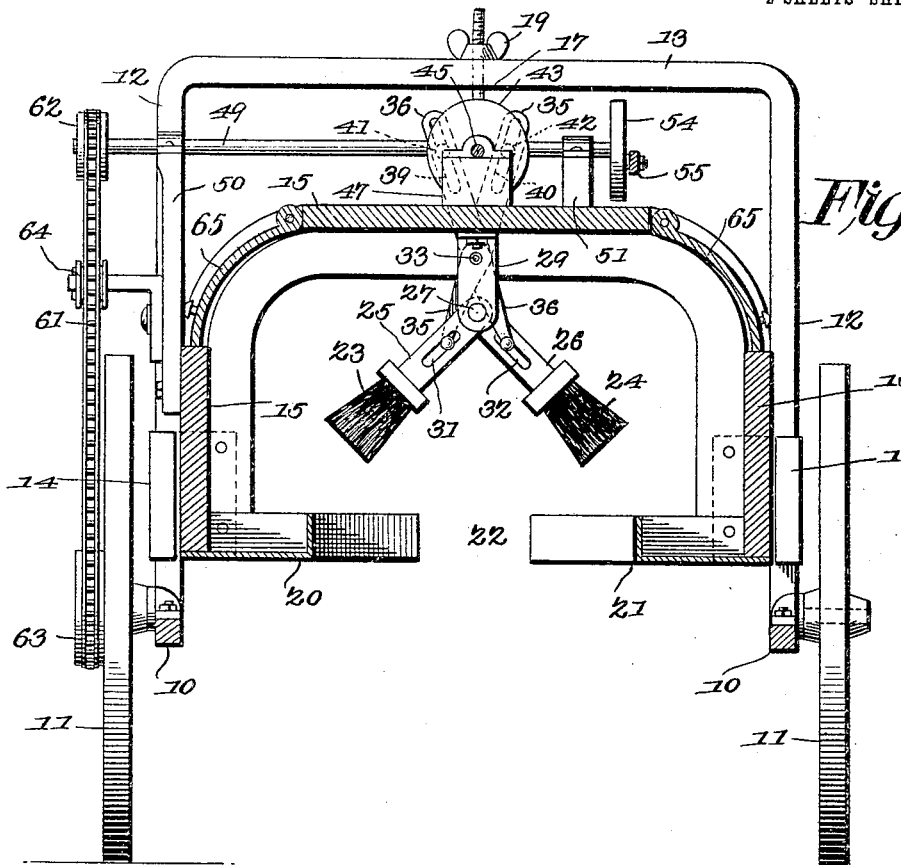
Figure 4:
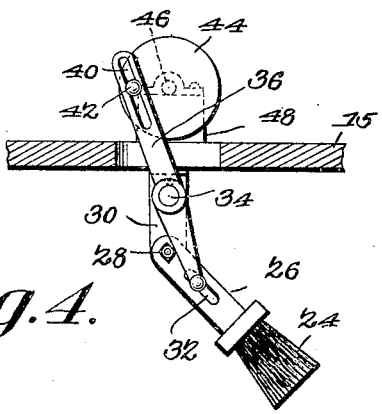

In the drawings thus employed, Figure 1 is a plan view of the improved apparatus. Fig. 2 is a longitudinal section of the same. Fig. 3 is a transverse section, enlarged. Fig. 4 is a detail of one of the brush-operating devices.

The improved apparatus comprises a supporting-frame 10, mounted upon carrying-wheels 11 and provided with vertical standards 12 and transverse members 13. Mounted for vertical adjustment upon the standards 12, as by clips 14, is a casing 15 in arched form for "straddling" the plants when growing in rows and suspended from the transverse members by threaded rods 16 17, slidably passing through the transverse members and provided with adjusting-nuts 18 19, bearing upon the same. By this means it is obvious the casing may be adjusted vertically to correspond to the plants over which it is to be moved.

Connected to the lower inner side of the casing 15 are trays or receptacles 20 21 for containing insect-destroying material of any suitable form and preferably converging toward the rear end of the casing, as at 22, so that as the apparatus is drawn forward the plants will be gathered and compressed between the receptacles and with their tops extending above them in the best position for leaving insects removed therefrom. Suspended for lateral vibration from the under side of the casing and centrally of the same are brushes 23 24, adapted when vibrated to strike the plants from side to side and knock the insects therefrom in the trays 20 21. Any required number of the brushes may be employed, but generally two will be sufficient, as shown, and will be supported in longitudinal alinement relative to the casing and frame and provided with means whereby the rear brush will be operated at greater speed than the forward brush. The brushes are provided with arms 25 26, pivoted, as at 27 28, to brackets or hangers 29 30, depending from the lower inner side of the casing 15 and centrally of the same, the brush-arms being centrally slotted, as at 31 32. Pivoted intermediately, as at 33 34, to the hangers 29 30 are lever-arms 35 36, pivoted by one end, respectively, as at 37 38, in the slots 31 32 and with their upper ends slotted, as at 39 40, for engaging crank-pins 41 42 upon face-plates 43 44, fast upon counter-shafts 45 46, mounted for rotation, as by bearings 47 48, upon the casing. A main drive-shaft 49 is mounted for rotation, as by hangers or standards 50 51, upon the casing 15 and connected to transmit motion to the counter-shaft 46 through a bevel-gear 52 on the main shaft and a bevel-pinion 53 on the counter-shaft, while the motion of the main shaft is also communicated to the counter-shaft 45 through the medium of a crank member 54 on the main shaft, connected by a rod 55 to a crank member 56 on an intermediate counter-shaft 57, secured for rotation upon the casing 15 by a bearing 58, and with a bevel-pinion 59 engaging a bevel-gear 60 on the counter-shaft 45. The main shaft 49 is driven by a chain 61, operating over chain-pulleys 62 63, respectively, upon the main shaft and one of the wheels 11, an idler-pulley 64 being arranged to take up the slack of the chain when the casing 15 is adjusted. By this arrangement it will be obvious that as the apparatus is drawn over the ground above the plants the latter will be gathered between the receptacles 20 21 and partially compressed to cause the "tops" of the plants to be correspondingly compressed and subjected to the action of the rapidly-vibrating brushes, which will effectually knock the insects from the leaves of the plants into the trays 20 21, whereby they will be destroyed.

It will be noted that the relatively large gear 52, operating the pinion 53, and the relatively small pinion 59, operating the relatively large gear 60, will cause the brushes to operate at different speeds, the rear brush 24 vibrating much more rapidly than the forward brush 23, so that as the apparatus is moved forward the comparatively slow-moving forward brush will first strike the plants, disturb the insects, and loosen them from the leaves, and then the more rapidly moving brush will complete the action by vigorously knocking them into the receptacles 20 21, where they are destroyed. The different movements imparted to the brushes is therefore an important feature of the invention and adds materially to the value and efficiency of the device.

Any suitable material may be employed in the trays 20 21, either liquid or solid or semi-liquid, as may be preferred, in practice sheets of adhesive or "sticky" paper having been employed; but the invention is not necessarily limited to any specific substance or material for this purpose.

Doors 65 are arranged in the casing 15, through which access is had to the pans or trays 20 21 for removal of the insects and the renewal of the destroying material.

The apparatus may be constructed of any suitable material and of any required size. Any required means may be employed for moving the apparatus over the ground, either manually or by horse-power, and attached in any suitable manner. Preferably a horse will be employed and connected by suitable shafts or thills (not shown) to spaced ears 66, the machine being guided by means of handles at 67.

Having thus fully described the invention, what is claimed is—

1. An apparatus for removing insects from plants, the same having plant-agitating members, and means for operating the plant-agitating members simultaneously at different rates of speed.

2. An apparatus for removing insects from plants, the same having a plurality of vibratory plant-engaging members, and means for operating said members simultaneously at different rates of speed.

3. An apparatus for removing insects from plants, the same having a plurality of oscillatory plant-engaging members, and means for actuating said members simultaneously at different rates of speed.

4. In an insect-destroyer, a casing for movement over the plants and provided with two or more brushes for vibrating contact with the plants and means for operating said brushes at different speeds.

5. In an insect-destroyer, spaced receptacles for insect-destroying material movable beneath the plants, and two or more brushes for vibrating contact with the plants and movable at different speeds from above the same.

6. In an insect-destroyer, a supporting member for movement over the plants, two or more brushes connected for vibrating from said supporting member and disposed in longitudinal alinement with the same, and means for operating said brushes at different speeds in contact with the plants.

7. In an insect-destroyer, a casing for passing over the plants, two or more brushes disposed in longitudinal alinement within said casing, and means for vibrating said brushes in contact with the plants with the rearward brush vibrating at greater speed than the forward brush.

8. An insect-destroyer having a supporting-frame and receptacles, a plurality of independent plant-engaging members for successively imparting lateral vibration to the plants, and means for actuating said members and imparting movement to the succeeding members at a higher rate of speed than the preceding members.

9. In an insect-destroyer, a supporting-frame having carrying-wheels, a casing mounted for vertical adjustment upon said frame, two or more brushes carried by said casing in longitudinal alinement with the same, and means for vibrating said brushes in contact with the plants from above the same, and with the rearward brush operating at greater speed than the forward brush.

10. In an insect-destroyer, a supporting structure having carrying-wheels, a drive-shaft mounted for rotation upon said supporting structure, means for communicating the motion of said carrier-wheels to said shaft, two or more brushes mounted for vibration from said supporting-frame and disposed in longitudinal alinement therewith, means for imparting the motion of said shaft to the forward brushes, and means for imparting the motion of said shaft to the rearward brush and at increased speed.

In testimony that we claim the foregoing as our own we have hereto affixed our signatures in the presence of two witnesses.

CALVIN L. IUNGERICH.
    CORNELIUS S. GROVE.

Witnesses:
 DAVID CHALLENGER,
 GEO. A. HOVERTER.